(12) United States Patent
Edwards et al.

(10) Patent No.: US 9,758,031 B2
(45) Date of Patent: Sep. 12, 2017

(54) RADIATOR GRILLE ARRANGEMENT FOR A VEHICLE

(71) Applicant: Daimler AG, Stuttgart (DE)

(72) Inventors: Stephen Edwards, Ehningen (DE); Holger Jakobs, Dettenhausen (DE); Heinz Mueller, Hennef (DE)

(73) Assignee: Daimler AG, Stuttgart (DE)

(*) Notice: Subject to any disclaimer, the term of this patent is extended or adjusted under 35 U.S.C. 154(b) by 21 days.

(21) Appl. No.: 15/036,777

(22) PCT Filed: Nov. 23, 2013

(86) PCT No.: PCT/EP2013/003544
§ 371 (c)(1),
(2) Date: May 13, 2016

(87) PCT Pub. No.: WO2015/074675
PCT Pub. Date: May 28, 2015

(65) Prior Publication Data
US 2016/0272060 A1    Sep. 22, 2016

(51) Int. Cl.
*B60K 11/08*    (2006.01)

(52) U.S. Cl.
CPC .................................. *B60K 11/085* (2013.01)

(58) Field of Classification Search
CPC ........ B60K 11/04; B60K 11/08; B60K 11/085
See application file for complete search history.

(56) References Cited

U.S. PATENT DOCUMENTS

| 4,169,501 A | * | 10/1979 | Takeuchi | B60K 11/085 |
| | | | | 123/41.49 |
| 8,161,919 B2 | * | 4/2012 | Klotz | B60K 11/085 |
| | | | | 123/41.04 |
| 8,181,727 B2 | * | 5/2012 | Ritz | B60K 11/085 |
| | | | | 180/68.1 |

(Continued)

FOREIGN PATENT DOCUMENTS

| DE | 10 2008 049 228 A1 | 6/2010 |
| DE | 10 2011 103 585 A1 | 12/2012 |

(Continued)

OTHER PUBLICATIONS

PCT/EP2013/003544, International Search Report (PCT/ISA/210) dated Aug. 4, 2014, with partial English translation (Six (6) pages).

*Primary Examiner* — Hau Phan
*Assistant Examiner* — Jacob Meyer
(74) *Attorney, Agent, or Firm* — Crowell & Moring LLP

(57) ABSTRACT

A radiator grille arrangement for a vehicle is disclosed. The grille arrangement has at least one support frame surrounding a primary air inlet, a number of closure flaps which are mounted for rotation around a flap rotation axis between a closed position and an open position, where flap levers are molded or formed on the closure flaps, the flap levers being operatively connected to a sliding bolt, and an actuating drive for positioning the closure flaps. A flap frame is provided for receiving the closure flaps, the sliding bolt and the actuating drive, where the flap frame is formed in two parts and is able to be attached to the support frame of a radiator shield in a non-positive, positive and/or firmly bonded manner.

6 Claims, 6 Drawing Sheets

(56) References Cited

U.S. PATENT DOCUMENTS

| | | | | |
|---|---|---|---|---|
| 8,398,131 B2* | 3/2013 | Boutaris | ............. | B60K 11/085 123/41.04 |
| 8,505,660 B2* | 8/2013 | Fenchak | ............. | B60K 11/085 180/68.1 |
| 8,550,887 B2* | 10/2013 | Walters | ................ | B60K 11/085 454/155 |
| 8,561,738 B2* | 10/2013 | Charnesky | ........... | B60K 11/085 180/68.1 |
| 8,561,739 B2* | 10/2013 | Hori | .................... | B60K 11/085 180/68.1 |
| 8,646,552 B2* | 2/2014 | Evans | ................. | B60K 11/085 180/68.1 |
| 8,720,624 B2* | 5/2014 | Remy | ................. | B60K 11/085 180/68.1 |
| 8,733,484 B1* | 5/2014 | Klop | .................... | B60K 11/085 180/68.1 |
| 8,752,886 B2* | 6/2014 | Wirth | ................... | B60K 11/085 180/68.6 |
| 8,807,166 B2* | 8/2014 | Charnesky | ........... | B60K 11/085 137/601.08 |
| 8,960,343 B2* | 2/2015 | Asano | ................. | B60K 11/085 180/68.1 |
| 8,973,607 B2* | 3/2015 | Schwarz | ............. | B60K 11/085 137/601.08 |
| 9,016,770 B2* | 4/2015 | Lanard | ................... | B62D 25/08 296/193.09 |
| 9,120,373 B2* | 9/2015 | Yoo | ....................... | B60K 11/085 |
| 9,150,096 B2* | 10/2015 | Takanaga | .............. | B60K 11/085 |
| 9,162,641 B2* | 10/2015 | Townson | ............... | B62D 25/084 180/68.6 |
| 9,168,828 B2* | 10/2015 | Bourqui | .................. | F16H 19/08 |
| 9,233,605 B2* | 1/2016 | Hijikata | ............... | B60K 11/085 |
| 9,333,850 B2* | 5/2016 | Ruppert | ............... | B60R 19/52 |
| 9,365,106 B2* | 6/2016 | Bruckner | ............ | B60K 11/085 |
| 9,393,861 B2* | 7/2016 | Hori | ....................... | B60K 11/04 |
| 9,446,660 B2* | 9/2016 | Asai | ..................... | B60K 11/085 |
| 9,447,719 B2* | 9/2016 | Kiener | ...................... | F01P 7/02 |
| 2010/0139583 A1* | 6/2010 | Klotz | .................. | B60K 11/085 123/41.04 |
| 2010/0243352 A1* | 9/2010 | Watanabe | ............ | B60K 11/085 180/68.1 |
| 2012/0074729 A1* | 3/2012 | Fenchak | .............. | B60K 11/085 296/193.1 |
| 2013/0068403 A1* | 3/2013 | Fenchak | .............. | B60K 11/085 160/218 |
| 2013/0223980 A1* | 8/2013 | Pastrick | .................... | F01D 5/00 415/1 |
| 2013/0284401 A1* | 10/2013 | Kiener | ...................... | F01P 7/02 165/98 |
| 2014/0194052 A1* | 7/2014 | Asano | .................. | B60K 11/085 454/335 |
| 2014/0216834 A1* | 8/2014 | Elliott | .................. | B60K 11/085 180/68.1 |
| 2014/0273807 A1* | 9/2014 | Frayer, III | ........... | B60K 11/085 454/335 |
| 2014/0335778 A1* | 11/2014 | Takanaga | ............. | B60K 11/085 454/333 |
| 2015/0159541 A1* | 6/2015 | Solazzo | ............... | B60K 11/085 73/114.68 |
| 2015/0231962 A1* | 8/2015 | Ruppert | ............... | B60K 11/085 180/68.1 |
| 2016/0059688 A1* | 3/2016 | Kim | ..................... | B60K 11/085 180/68.1 |
| 2016/0089971 A1* | 3/2016 | Asai | ..................... | B62D 25/085 296/193.1 |
| 2016/0207394 A1* | 7/2016 | Vacca | .................. | B60K 11/085 |
| 2016/0236563 A1* | 8/2016 | Ruppert | ............... | B60K 11/085 |

FOREIGN PATENT DOCUMENTS

| | | |
|---|---|---|
| DE | 10 2012 012 677 A1 | 12/2013 |
| EP | 2 407 333 A1 | 1/2012 |
| EP | 2 574 484 A1 | 4/2013 |

\* cited by examiner

… (1) …

RADIATOR GRILLE ARRANGEMENT FOR A VEHICLE

BACKGROUND AND SUMMARY OF THE INVENTION

The invention relates to a radiator grille arrangement for a vehicle, which comprises at least one support frame surrounding a primary air inlet, a number of closure flaps which are mounted for rotation around a flap rotation axis between a closed position and an open position, wherein flap levers are moulded or formed on the closure flaps, the flap levers being operatively connected to a sliding bolt, and an actuating drive for positioning the closure flaps.

Such a radiator grille arrangement for a motor vehicle is known from DE 10 2011 103 585 A1. The radiator grille arrangement has a support frame which surrounds a primary air inlet, having at least one flap row which has several adjacent flaps, wherein the flaps are able to be adjusted between an open position to open an inlet section of the primary air inlet allocated to the respective flap rows and a closed position to close this inlet section. The flaps thereby have at least one respective flap lever which is mounted for pivoting around a flap pivot axis of the respective flap. A sliding bolt is also provided which is arranged on the support frame in a bidirectionally adjustable manner and which is drive-connected to at least one flap lever per flap of the flap row allocated to the sliding bolt, wherein the support frame additionally has an actuating drive to adjust the flaps between the open position and the closed position. A positioning results for the actuating drive when the actuating drive is drive-connected to at least one drive lever which is mounted for rotation around a drive rotation axis, when the drive lever rotation axis has an angle of inclination with respect to the flap pivot axes of the flaps of the respective flap row and when the drive lever is drive-connected to the sliding bolt or to one of the flap levers via a coupling device, which is tolerant with respect to the angle of inclination.

Moreover, a radiator grille arrangement for a motor vehicle front part of a motor vehicle is known from DE 10 2008 049 228 A1 which comprises a plurality of air passage openings which can be closed at least substantially by means of at least one flap element of a flap arrangement. The at least one flap element is thereby mounted for pivoting around an associated flap axis, wherein the at least one flap element is able to be pivoted between a closed position, in which it closes an allocated air passage opening, and an open position, in which it completely releases an allocated air passage opening.

The object of the invention is to specify an improved radiator grille arrangement for a vehicle compared to prior art.

A radiator grille arrangement for a vehicle comprises at least one support frame surrounding a primary air inlet, a number of closure flaps which are mounted for rotation around a flap rotation axis between a closed position and an open position, wherein flap levers are moulded or formed on the closure flaps, the flap levers being operatively connected to a sliding bolt, and an actuating drive for positioning the closure flaps. According to the invention, a flap frame is provided for receiving the closure flaps, the sliding bolt and the actuating drive, wherein the flap frame is formed in two parts and is able to be attached to the support frame of a radiator shield in a non-positive, positive and/or firmly bonded manner.

As a result of the closure flaps, the sliding bolt and the actuating drive being arranged on the flap frame, these components are all able to be arranged on a component such that handling during the production of the radiator grille arrangement is facilitated.

In addition, the flap frame serves as a painting means for coating the closure flaps, wherein further handling of the closure flaps after the painting process is no longer required since the closure flaps are already arranged on the flap frame. As such, at least the risk of damage to the coating of the closure flaps and the support frame are advantageously reduced.

Exemplary embodiments of the invention are illustrated in greater detail below by means of subsequent drawings.

DETAILED DESCRIPTION OF THE DRAWINGS

Figure 1:
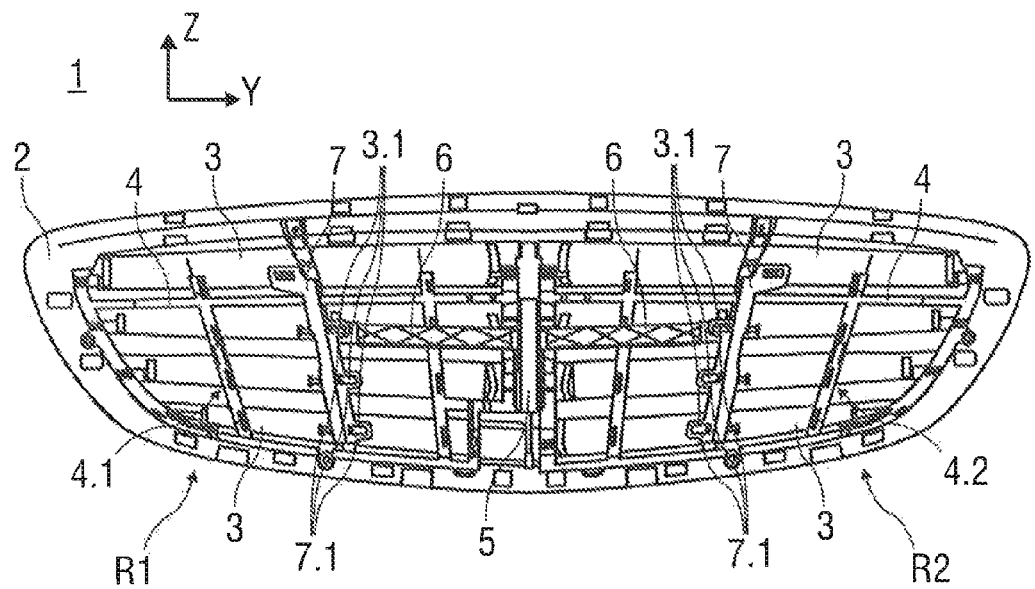
FIG. 1 shows schematically, a radiator grille arrangement for a vehicle having closure flaps in a closed position.

Parts that correspond to one another are provided with the same reference numerals in all figures.

In FIG. 1, a radiator grille arrangement 1 for a vehicle which is not depicted in more detail is shown in a rear view. The radiator grille arrangement 1 consists of a support frame 2 surrounding a primary air inlet, closure flaps 3 which have a closed position according to FIG. 1, a flap frame 4, an actuating drive 5, two drive levers 6 and two sliding bolts 7.

Such a radiator grille arrangement 1 serves to open and close the primary inlet opening depending on operating states of the vehicle. The primary inlet opening is closed, in particular, when there is low heat load or when the combustion engine is switched off, in order to prevent unnecessary cooling by airflow and/or or undesired heat discharge through the primary inlet opening. Moreover, closing the primary inlet opening can lead to a considerable improvement in the drag coefficient, the so-called cW value of the vehicle, when there is a comparatively high driving speed.

The radiator grille arrangement 1 has two flap rows R1, R2, which each comprise four closure flaps 3 and are arranged one alongside the other. The closure flaps 3 of a flap row R1, R2 are thereby arranged one above the other in relation to the vehicle vertical axis Z, wherein the longitudinal axes of the closure flaps 3 extend perpendicularly to the vehicle vertical axis Z and in parallel to the vehicle transverse axis Y.

Figure 2:
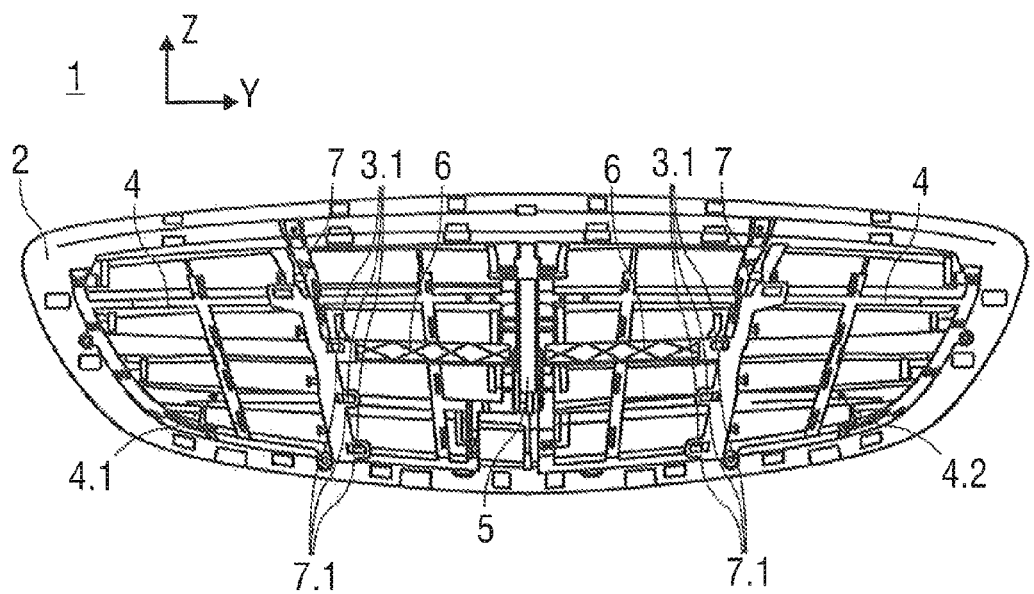
FIG. 2 shows schematically, a radiator grille arrangement having closure flaps in an open position.

The closure flaps 3 are mounted for pivoting within their flap row R1, R2 between the closed position, which is shown in the present exemplary embodiment according to FIG. 1, and an open position, which is shown in FIG. 2, wherein a flap rotation axis runs centrally on this with respect to the height of the respective closure flap 3.

Each of the closure flaps 3 has a flap lever 3.1 which is able to be pivoted around the flap rotation axis, wherein the flap lever 3.1 is arranged in a recess 7.1 of the sliding bolt 7, the longitudinal axis of which runs perpendicularly to the longitudinal axis of the closure flaps 3. Due to the arrangement of a flap lever 3.1 in a recess 7.1 of the sliding bolt 7, the respective closure flap 3 and the sliding bolt 7 are drive-connected, wherein the operative connection is depicted in more detail in FIGS. 10 and 11.

To adjust the closure flaps 3, the respective sliding bolt 7 of a flap row R1, R2 is connected to the actuating drive 5 via a drive lever 6, which is located substantially in the middle in relation to the transverse extension of the radiator grille arrangement 1 and in relation to the vehicle transverse axis Y and is allocated to both flap rows R1, R2.

Both drive levers 6 are mounted for rotation around a drive lever rotation axis. Wherein the drive levers 6 are in particular mounted for rotation around a mutual drive lever rotation axis.

The respective drive lever 6 furthermore has a coupling device which is drive connected to the associated sliding bolt 7, wherein the coupling device can be formed as a spherical head bearing. Alternatively, the coupling device can also be formed as another bearing.

The coupling device formed on the drive lever 6 comprises a spherical head pan, which is not depicted in more detail, the shape of which corresponds to a spherical head which is formed on the flap frame 4 and is not shown, such that a connection of the respective drive lever 6 on the flap frame 4 is made. The coupling device also has a pin 6.1 which is engaged with the sliding bolt 7 and the sliding bolt 7 is thereby able to be driven, i.e., moved. The driving of the sliding bolt 7 therefore takes place directly and not indirectly via a flap lever 3.1 as in prior art.

In FIG. 2, the radiator grille arrangement 1 is depicted in the open position of the closure flaps 3.

Figure 3:
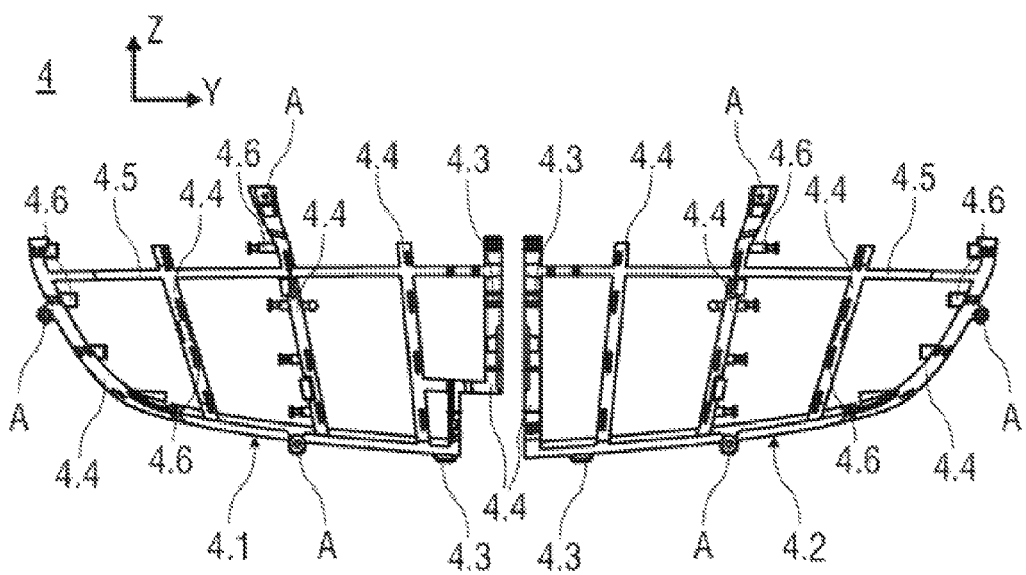
FIG. 3 shows schematically, a flap frame for a radiator grille arrangement of a vehicle.

The closure flaps 3, the sliding bolt 7 and the actuating drive 5 are arranged on the flap frame 4 shown in detail in FIG. 3, the flap frame 4 having two frame components 4.1, 4.2. A first frame component 4.1 is thereby arranged in the region of a first flap row R1 and a second frame component 4.2 is arranged in the region of a second flap row R2 of the radiator grille arrangement 1.

The flap frame 4 serves to receive the closure flaps 3, the actuating drive 5 and the sliding bolt 7, wherein both frame components 4.1, 4.2 are able to be attached to the support frame 2 of a radiator shield which is not shown via three screw points A respectively. For this purpose, a connection element which is not depicted in more detail, in particular a screw, is able to be put through a respective screw point A and screwed to the support frame 2. In addition, the frame components 4.1, 4.2 have latching elements 4.3 which correspond to latching elements which are formed on the support frame 2 and are not shown in more detail, such that the flap frame 4 can be attached both positively and non-positively to the support frame 2 of the radiator grille arrangement 1.

The flap frame 4 is formed of longitudinal struts 4.4 and transverse struts 4.5, wherein the respective frame component 4.1, 4.2 is formed in one piece with its longitudinal struts 4.4 and transverse struts 4.5.

Receiving units in the form of bearing points 4.6 are formed on the longitudinal struts 4.4 running substantially vertically, on which bearing points 4.6 the closure flaps 3 are able to be attached at least positively, in particular are able to be locked. A closure flap 3 according to the present exemplary embodiment according to FIG. 3 is able to be attached to three longitudinal struts 4.4 of a frame component 4.1, 4.2 of the flap frame 4.

As an alternative to forming the receiving units as bearing points 4.6, the closure flaps 3 can also be formed by means of a clip connection or other connection possibilities, in particular for positive attachment of the closure flaps 3 on the support frame 2, wherein a pivotal movement of the closure flaps 3 can be achieved.

The closure flaps 3 are attached to the respective frame component 4.1, 4.2 of the flap frame 4 before mounting the radiator grille arrangement 1 and then painted, such that the flap frame 4 also serves as a paint holder for the closure flaps 3 and the application times in a painting facility can thereby be reduced. Since the closure flaps 3 are painted after mounting on the flap frame 4, further handling and possible damage resulting from this to the coating of the closure flaps 3 and the support frame 2 after the painting process are eliminated to the greatest extent possible.

Figure 4:
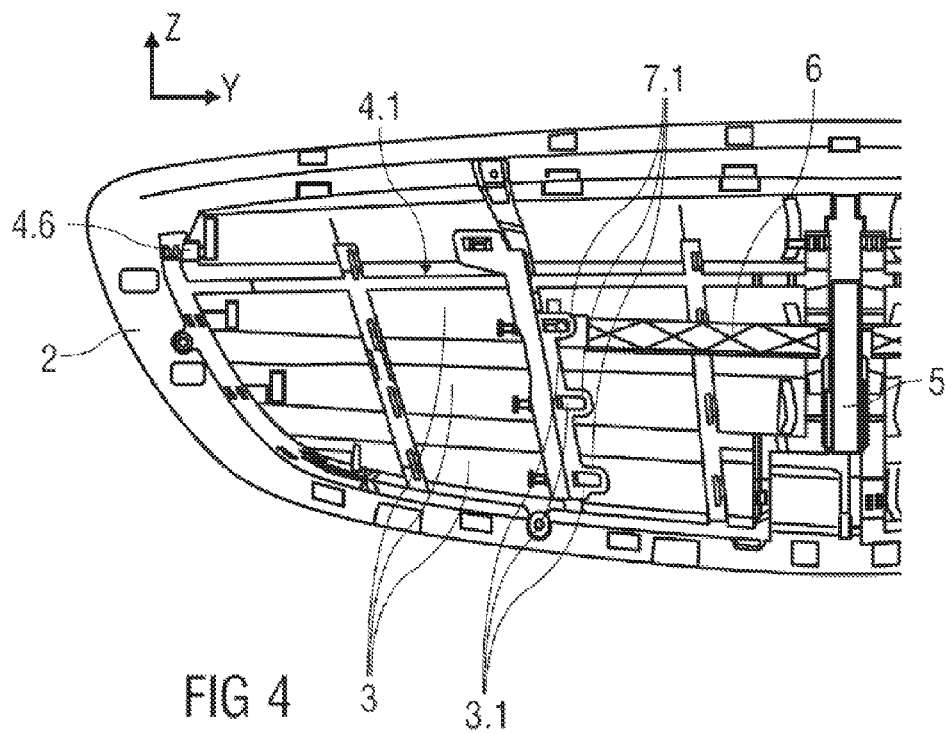
FIG. 4 shows schematically, a section of a support frame having an attached flap frame.

In the mounted condition of the flap frame 4, as in FIGS. 1 and 2 as well as the section in FIG. 4, both frame components 4.1, 4.2 are attached to the support frame 2 in such a way that spacing is formed between internal longitudinal struts 4.4. This spacing serves to at least reduce the risk of damage to the flap frame 4 and the closure flaps 3, in particular in the event of the vehicle colliding at a comparatively low collision speed.

An actuator in the form of the actuating drive 5 is depicted as an outline, i.e., in FIG. 4, and is attached to the flap frame 4 in a floating manner during assembly, wherein the actuating drive 5 is arranged in sections between the frame components 4.1, 4.2 in the mounted condition. The actuating drive has so-called mounting ribs which are not shown in detail which are inserted into the flap frame 4. Upper mounting ribs formed laterally on the actuating drive 5 are thereby latched to corresponding form parts formed on the flap frame 4 such that the actuating drive 5 is held securely on the flap frame 4 and is secured against falling out.

When the actuating drive 5 is dismantled, for example caused by it having a fault, a respective locking lever, preferably formed on the flap frame 4, is pressed down such that the actuating drive 5 can be removed from above with respect to the flap frame 4.

In particular, the actuating drive 5 is mounted in a floating manner in the Y direction, so in the direction of the vehicle transverse axis Y, by means of its mounting ribs, by means of which possible tolerances can be offset, for example in relation to the frame components 4.1, 4.2 and their inner longitudinal struts 4.4, and also, as described above, the risk of minimal damage in the event of a collision of the vehicle can at least be reduced.

Figure 5:
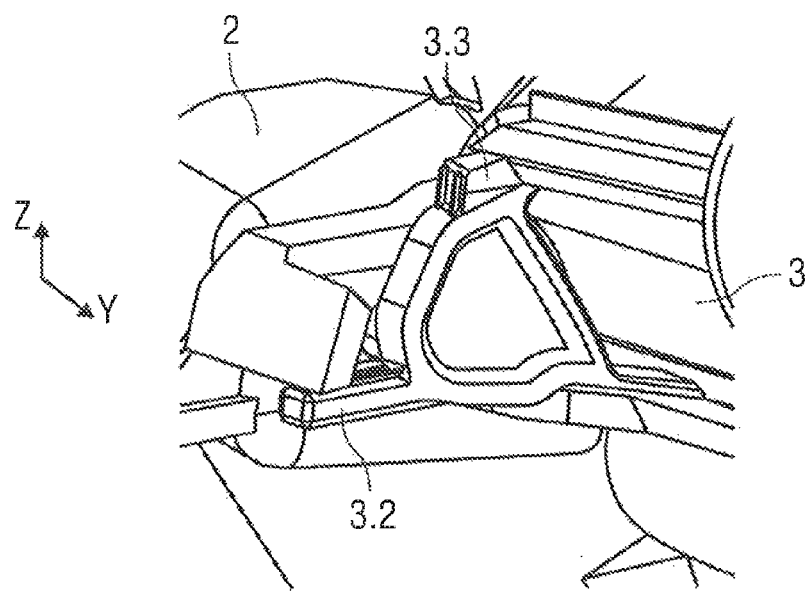
FIG. 5 shows schematically, an enlarged section of a perspective view of a closure flap in a closed position.
Figure 6:
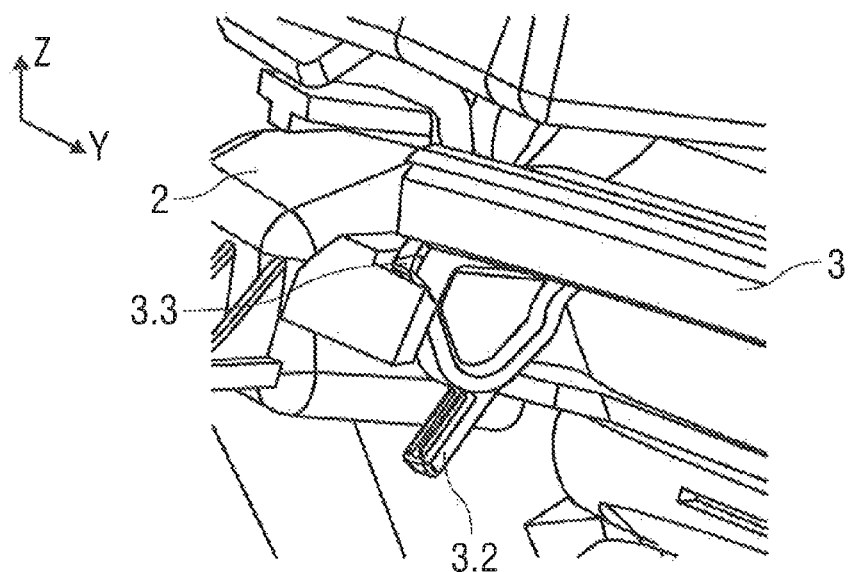
FIG. 6 shows schematically, an enlarged section of a perspective view of closure flap in an open position.
Figure 7:
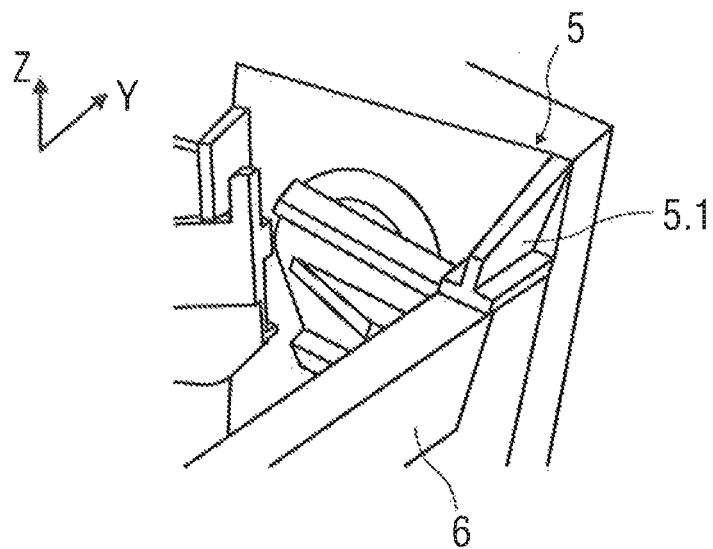
FIG. 7 shows schematically, an enlarged section of a perspective view of a closure flap in the closed position in the region of an actuating drive.
Figure 8:
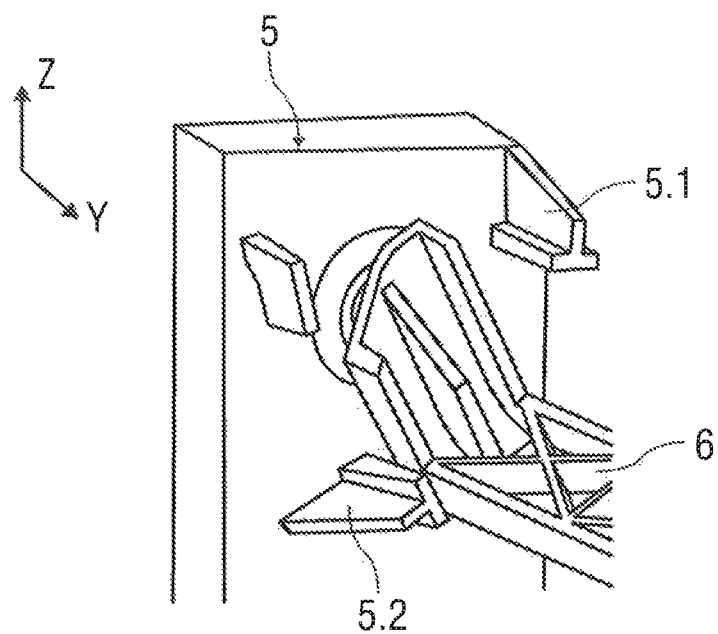
FIG. 8 shows schematically, an enlarged section of a perspective view of as closure flap in the open position in the region of an actuating drive.

In addition, end stops 5.1, 5.2 shown in FIGS. 7 and 8 are thrilled on the actuating drive 5, which are provided to initiate an excess torque in the actuating drive 5 near the drive such that the excess torque is not initiated permanently in stop elements 3.2, 3.3 formed on the closure flaps 3, the stop elements 3.2, 3.3 being shown in FIGS. 5 and 6. As a result, wearing of a material of the stop elements 3.2, 3.3 and damage to a drive mechanism and the closure flaps 3 can be counteracted to the greatest extent possible by means of a comparatively high torque application.

The stopping concept is carried out in two stages, wherein the stop elements 3.2, 3.3 are formed on the closure flaps 3 in the direction of an outer longitudinal strut 4.4 of the respective frame component 4.1, 4.2. The two-stage stopping concept results in particular from the fact that, after contact between the closure flaps 3 and a first stop plane, a slight elastic twisting of the drive lever 6 occurs, the drive lever 6 being formed in particular as a crank drive. This results in delayed contact between the closure flaps 3 and a second stop plane.

In order to ensure that an upper edge and a lower edge of the respective closure flap 3 are distanced from the support frame 2 with a predetermined clearance in the mounted condition of the radiator grille arrangement 1, the stop elements 3.2, 3.3 are formed as flap bearings on each bearing point 4.6, formed at least on the outer longitudinal strut 4, wherein a first stop element 3.2 is provided for the open position and a second stop element 3.3 is provided for the closed position. The stop elements 3.2, 3.3 thereby hit a form element formed on the support frame 2 in the respective position. By means of these stop elements 3.2, 3.3, noise production, in particular rattling caused by the closure flaps 3 hitting the support frame 2, is substantially prevented when driving the vehicle on an uneven road, when driving on so-called poor road surfaces.

A torque which exceeds the torque by means of which the respective closure flap 3 is pressed onto the corresponding stop element 3.2, 3.3 of the bearing point 4.6 implemented as a flap bearing, is directly introduced into the actuating drive 5 through the second stop plane, in particular the one which is formed on the actuating drive 5, by means of which a three level of the drive mechanism is limited and damage can thus be avoided to the greatest extent possible. The second stop plane is depicted in more detail in FIGS. 7 and 8.

The second stop plane comprises the end stops 5.1, 5.2 formed on the actuating drive 5, wherein a first end stop 5.1 is provided for the respective drive lever 6 in the closed position and a second end stop 5.2 is provided for the respective drive lever 6 in the open position of the closure flaps 3.

The first stop plane is formed on the inner and outer bearing points 4.3 and 4.6 of the closure flaps 3, wherein the second stop plane is located on the actuating drive 5. The second stop plane is thereby formed particularly preferably on both sides of the actuating drive 5 in the region of the drive connection with the drive levers 6.

Figure 9:
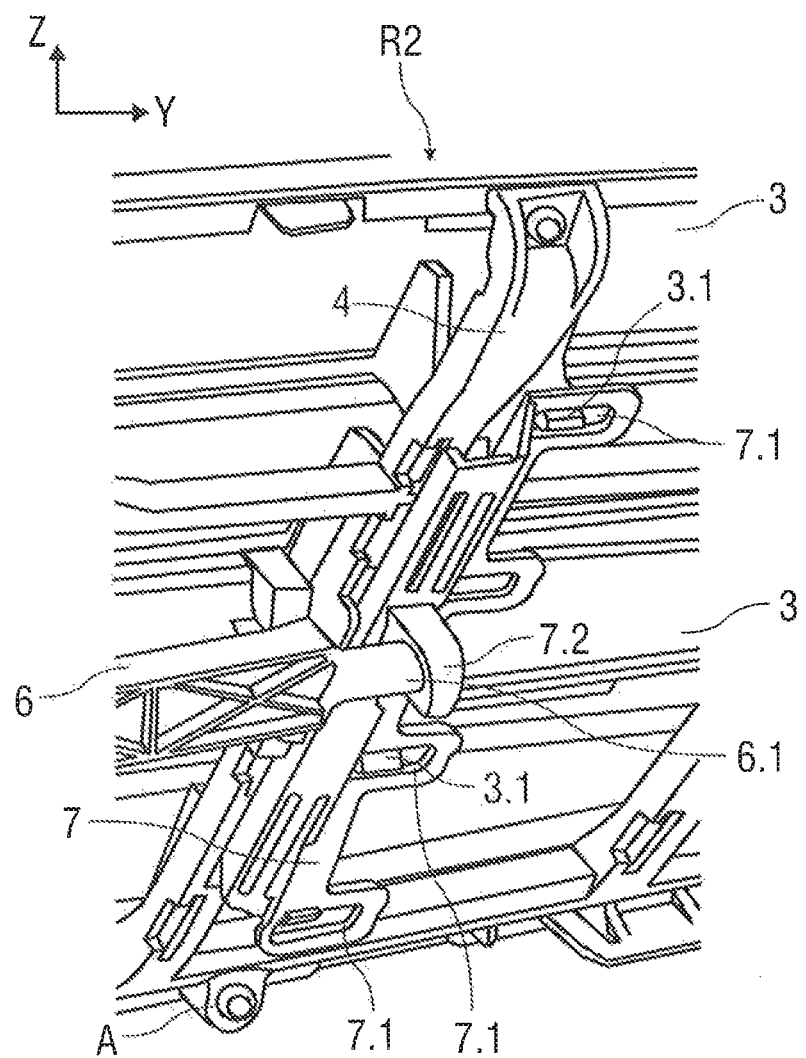
FIG. 9 shows schematically, an enlarged section of a perspective view of a sliding bolt.

As described above, the closure flaps 3 are controlled via the actuating drive 5 which is drive-connected on both sides to a respective drive lever 6, wherein the respective drive lever 6 is in turn connected to a respective sliding bolt 7 via its coupling device. This connection is thereby made by arranging the pin 6.1 in a receiving unit 7.2 on the sliding bolt 7. The connection between the drive lever 6 and its allocated sliding bolt 7 is shown in more detail in FIG. 9 in as perspective view.

By means of the pin 6.1, the torque of the actuating drive 5 can be transferred to the sliding bolt 7 via the drive lever 6, wherein the drive lever 6 is also mounted in a floating manner. In particular, the respective drive lever 6 is mounted in a floating manner along its drive axis in a cavity of the actuating drive 5. However, the bearing of the drive lever 6 in the coupling device which is formed as a spherical head bearing takes place in a non-floating manner such that a floating bearing and a fixed bearing are formed.

The sliding bolt 7 is driven by means of the pin 6.1 formed as a coupling device on the drive lever 6, such that all closure flaps 3 of both flap rows R1, R2 are actuated at the same time during control by the actuating drive 5 and this actuation takes place synchronously.

Figure 10:
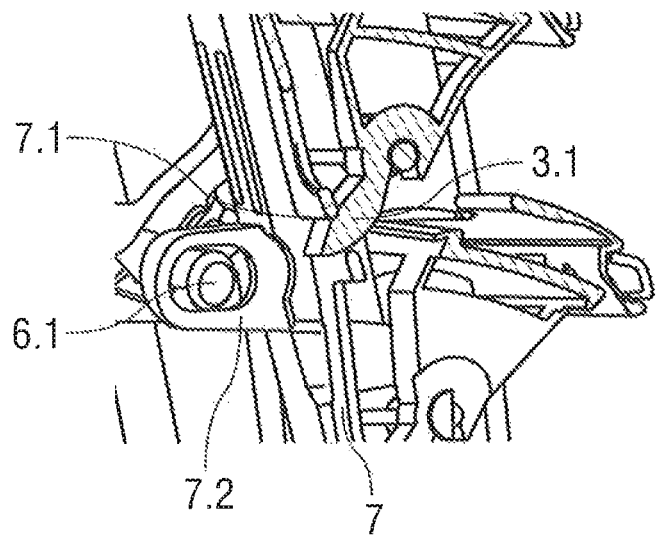
FIG. 10 shows schematically, an enlarged section of a perspective view of an operative connection between the closure flap and sliding bolt in the open position.
Figure 11:
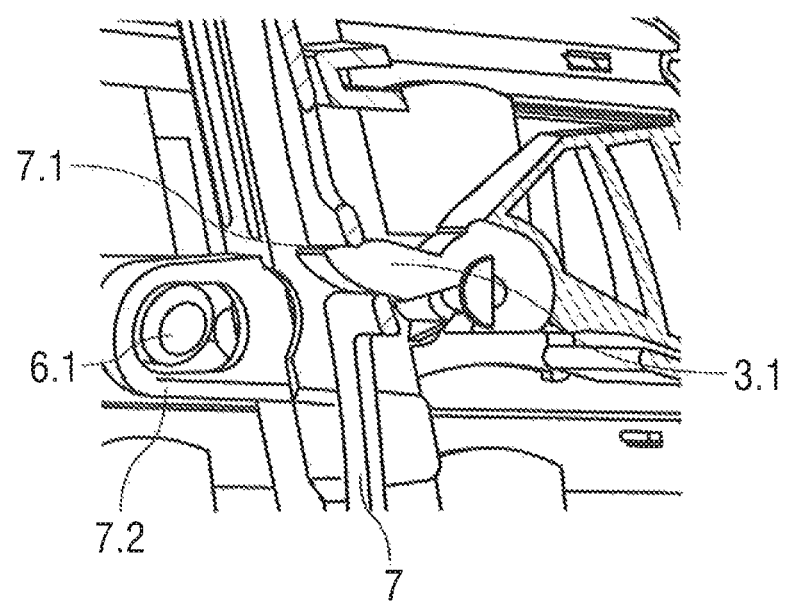
FIG. 11 shows schematically, an enlarged section of a perspective view of an operative connection between the closure flap and sliding bolt in the closed position.

The sliding bolt 7 is translational, so able to be moved in a straight line, wherein the translational movement results from the torque of the actuating drive 5. The sliding bolt 7 is therefore mounted moveably on the flap frame 4 and an actuating force is introduced into a flap lever 3.1 formed on the respective closure flap 3 by the sliding bolt 7. A flap lever 3.1 of a closure flap 3 is therefore arranged in a recess 7.1 of the sliding bolt 7, as is shown in more detail in FIGS. 10 and 11. FIG. 10 shows the flap lever 3.1 in the open position and in FIG. 11, the flap lever 3.1 is shown in the closed position of the respective closure flap 3.

The respective flap lever 3.1 is formed in such a way that contact surfaces of the flap lever 3.1 continuously lie on the edge region limiting the recess 7.1 irrespective of a positioning of the closure flap 3 and thus no clearance is formed, which is referred to as play.

The flap levers 3.1 are formed in such a way that the ends facing one another taper off, wherein the flap levers 3.1 are formed at least on average at least almost symmetrically and have a curvature, such that, at all times, contact is ensured between the flap lever 3.1 and the sliding bolt 7. The flap lever 3.1 and the recess 7.1 are thus formed as a so-called constraining guide, which is known under the term Desmodromic. By means of such a form of the flap levers 3.1 and the recesses 7.1, play between the respective recess 7.1 and the associated flap lever 3.1 is at least minimized.

By means of a constraining guide formed in such a way between the flap lever 3.1 of the respective closure flap 3 and the recess 7.1 of the sliding bolt 7.1, it is possible that the closure flaps 3 can adopt any partial opening position without rattling resulting, in particular through the striking of the flap lever 3.1 in the respective recess 7.1 when the vehicle is driven on an uneven road or similar driving conditions.

Moreover, a synchronous running of the closure flaps 3 is ensured by means of the constraining guide when the closed position is adopted and when the open position is adopted.

The invention claimed is:

1. A radiator grille arrangement for a vehicle, comprising:
a support frame surrounding a primary air inlet;
a plurality of closure flaps which are each rotatably mounted around a respective flap rotation axis between a closed position and an open position, wherein respective flap levers are moulded or formed on each of the plurality of closure flaps and wherein the flap levers are operatively connected to a sliding bolt;
an actuating drive for positioning of the plurality of closure flaps;
a flap frame, wherein the plurality of closure flaps; the sliding bolt, and the actuating drive are disposed on the flap frame, wherein the flap frame is formed in two parts, and wherein the flap frame is attached to the support frame in a non-positive manner and a positive manner; and
wherein receiving units are formed or moulded on the flap frame and wherein the plurality of closure flaps, the sliding bolt, and the actuating drive are received on the receiving units.

2. The radiator grille arrangement according to claim 1, wherein a movement transferred to the plurality of closure flaps by the actuating drive is limitable by stop elements formed on the support frame and the plurality of closure flaps.

3. The radiator grille arrangement according to claim 1, wherein end stops are formed the actuating drive and wherein a pivotal movement of a drive lever is limitable by the end stops.

4. The radiator grille arrangement according to claim 1, wherein the actuating drive is coupled to the sliding bolt such that a torque of the actuating drive is transferable to the plurality of closure flaps by the sliding bolt.

5. The radiator grille arrangement according to claim 1, wherein the flap levers are formed such that a respective flap lever lies substantially continuously in a recess allocated to the respective flap lever, irrespective of a movement of the sliding bolt.

6. The radiator grille arrangement according to claim 1, wherein the flap rotation axis of a respective closure flap is arranged centrally.

* * * * *